United States Patent
Yamada

(10) Patent No.: US 9,945,742 B2
(45) Date of Patent: Apr. 17, 2018

(54) TORQUE SENSOR AND ELECTRIC POWER STEERING APPARATUS

(71) Applicant: KYB Corporation, Tokyo (JP)

(72) Inventor: Ryota Yamada, Gifu (JP)

(73) Assignee: KYB Corporation, Tokyo (JP)

( * ) Notice: Subject to any disclaimer, the term of this patent is extended or adjusted under 35 U.S.C. 154(b) by 0 days.

(21) Appl. No.: 15/326,646

(22) PCT Filed: Jul. 3, 2015

(86) PCT No.: PCT/JP2015/069336
§ 371 (c)(1),
(2) Date: Jan. 16, 2017

(87) PCT Pub. No.: WO2016/009860
PCT Pub. Date: Jan. 21, 2016

(65) Prior Publication Data
US 2017/0211995 A1   Jul. 27, 2017

(30) Foreign Application Priority Data

Jul. 17, 2014   (JP) .................................. 2014-146731

(51) Int. Cl.
*G01L 3/00*   (2006.01)
*G01L 3/10*   (2006.01)
(Continued)

(52) U.S. Cl.
CPC ............ *G01L 3/101* (2013.01); *B62D 5/0409* (2013.01); *B62D 6/10* (2013.01); *G01L 5/221* (2013.01)

(58) Field of Classification Search
CPC ....... G01L 3/101; G01L 5/221; B62D 5/0409; B62D 6/10
(Continued)

(56) References Cited

U.S. PATENT DOCUMENTS

| 4,874,053 A * | 10/1989 | Kimura | ..................... B62D 6/10 |
| | | | 180/443 |
| 2001/0029791 A1* | 10/2001 | Sezaki | ..................... G01L 3/102 |
| | | | 73/862.333 |

(Continued)

FOREIGN PATENT DOCUMENTS

| JP | 2012-194144 A | 10/2012 |
| WO | 2011/064245 A1 | 6/2011 |
| WO | 2011/143544 A2 | 11/2011 |

*Primary Examiner* — Max Noori
(74) *Attorney, Agent, or Firm* — Hauptman Ham, LLP

(57) ABSTRACT

The torque sensor includes a detection unit for detecting the magnetic transition through a through hole formed so as to penetrate a radial-side surface of the housing; a housing chamber formed to be raised outward in a radial direction from an outer circumferential surface of the housing so that the through hole opens into the housing chamber accommodating the detection unit; a communication hole provided so as to extend in the tangential direction with respect to an outer circumference of the housing, the communication hole making an outside of the housing and an inside of the housing chamber communicate with each other; and an output terminal fitted into the communication hole and connected to the detection unit in a tilting state, the output terminal being configured to output a signal to the outside on the basis of a detected signal.

5 Claims, 8 Drawing Sheets

(51) Int. Cl.
*B62D 5/04* (2006.01)
*B62D 6/10* (2006.01)
*G01L 5/22* (2006.01)

(58) Field of Classification Search
USPC .................................................. 73/862.325
See application file for complete search history.

(56) References Cited

U.S. PATENT DOCUMENTS

| | | | | |
|---|---|---|---|---|
| 2005/0223820 | A1* | 10/2005 | Murakami | G01L 5/221 73/862.331 |
| 2016/0138983 | A1* | 5/2016 | Ikeda | B62D 15/0215 73/862.193 |
| 2016/0153849 | A1* | 6/2016 | Takahashi | B62D 6/10 73/862.325 |
| 2016/0153850 | A1* | 6/2016 | Takahashi | G01R 33/07 73/862.325 |

* cited by examiner

TORQUE SENSOR AND ELECTRIC POWER STEERING APPARATUS

TECHNICAL FIELD

The present invention relates to a torque sensor and an electric power steering apparatus.

BACKGROUND ART

JP2012-194144A discloses a non-contact type torque sensor that detects a steering torque acting on a steering shaft of an electric power steering apparatus mounted on a vehicle by a magnetic force. The torque sensor includes a magnetism generating portion that is fixed to an input shaft, a rotating magnetic circuit portion that is fixed to an output shaft, a fixed magnetic circuit portion that is fixed to a housing accommodating the input shaft and the output shaft, and a magnetic sensor that detects a magnetic flux density guided to the fixed magnetic circuit portion.

When a torque acts on a torsion bar, which links the input shaft to the output shaft, and the torsion bar is torsionally deformed, a relative position between the magnetism generating portion and the rotating magnetic circuit portion in the rotating direction is changed. Consequently, the magnetic flux density guided from the magnetism generating portion to the fixed magnetic circuit portion via the rotating magnetic circuit portion is changed. The magnetic sensor outputs the signal corresponding to the magnetic flux density. The torque acting on the torsion bar is detected on the basis of the signal output from the magnetic sensor.

The torque sensor also includes a resin sensor holder that integrally accommodates a magnetism collecting yoke of the fixed magnetic circuit portion, the magnetic sensor, and a circuit board connected to the magnetic sensor. An output terminal is provided on the outer surface of the sensor holder in order to guide the signal output from the magnetic sensor to the circuit board into an external controller and the like.

SUMMARY OF INVENTION

In the conventional technology described above, because the output terminal is provided on the outer surface of the sensor holder, the output terminal projects in the radial direction of the steering shaft, so that mountability of the torque sensor to a vehicle may be deteriorated.

The present invention has an object to provide a torque sensor capable of improving mountability to a vehicle by reducing the projection amount in the radial direction.

According to one aspect of the present invention, a torque sensor for detecting a torque acting to a input shaft on the basis of magnetic transition caused by relative angular displacement between the input shaft and an output shaft rotatably supported in a housing includes: a detection unit configured to detect the magnetic transition through a through hole formed so as to penetrate a radial-side surface of the housing; a housing chamber formed to be raised outward in a radial direction from an outer circumferential surface of the housing, the through hole opening into the housing chamber accommodating the detection unit; a communication hole provided so as to extend in a tangential direction with respect to an outer circumference of the housing, the communication hole making an outside of the housing and an inside of the housing chamber communicate with each other; and an output terminal fitted into the communication hole and connected to the detection unit in a tilting state, the output terminal being configured to output a signal to outside on the basis of a detected signal.

DESCRIPTION OF EMBODIMENTS

The following describes an embodiment of the present invention with reference to the attached drawings.

Figure 1:
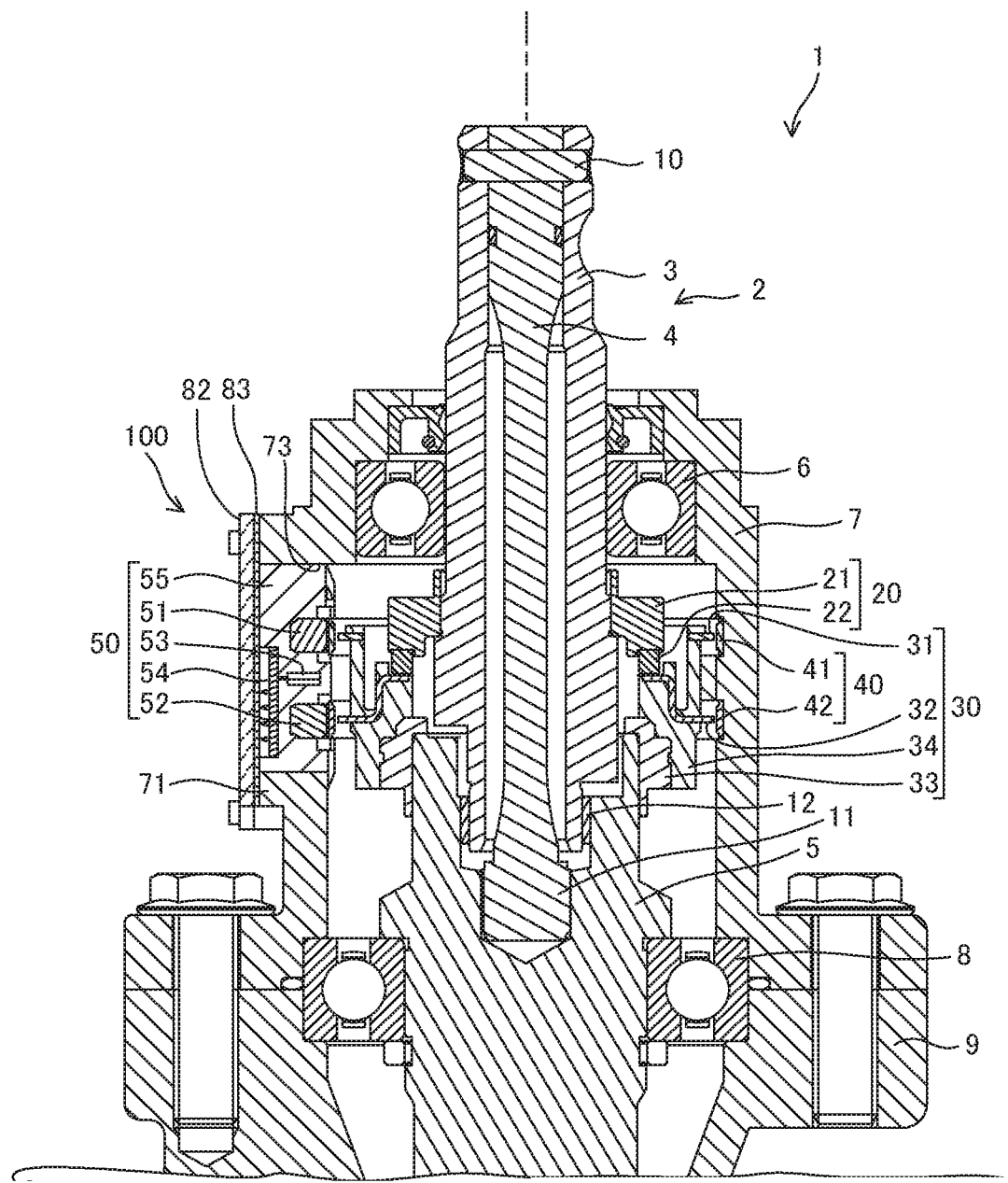
FIG. 1 is a longitudinal cross-sectional diagram illustrating a part of an electric power steering apparatus to which a torque sensor according to an embodiment of the present invention is applied.

FIG. 1 is a longitudinal cross-sectional diagram illustrating a part of an electric power steering apparatus 1 to which a torque sensor 100 according to the present embodiment is applied.

In the electric power steering apparatus 1, a steering shaft 2 that is linked to a steering wheel rotates in conjunction with the steering wheel. Thereby, a rack shaft that meshes with a pinion provided on a lower end of the steering shaft 2 moves in the axial direction so as to steer a vehicle wheel.

The electric power steering apparatus 1 includes, as an assist mechanism for applying an auxiliary steering torque, a worm wheel that is linked to the steering shaft 2, a worm that meshes with the worm wheel, and an electric motor that drives the worm to rotate. In the electric power steering apparatus 1, the auxiliary steering torque is applied to the steering shaft 2 by the electric motor.

The steering shaft 2 includes an input shaft 3, serving as an input shaft, that is linked to the steering wheel, a torsion bar 4 of which one end is linked to the input shaft 3, and an output shaft 5, serving as an output shaft, that is linked to the other end of the torsion bar 4. The input shaft 3 is rotatably supported on an upper housing 7, serving as a housing, via a roller bearing 6. The output shaft 5 is rotatably supported on a lower housing 9 via a roller bearing 8. A slide bearing 12 is interposed between an outer periphery on the bottom end side of the input shaft 3 and an inner periphery on the top end side of the output shaft 5. The input shaft 3 and the output shaft 5 are supported on the upper housing 7 and the lower housing 9, respectively, so as to be rotatable coaxially.

The input shaft 3 is formed in a cylindrical shape, and the torsion bar 4 is accommodated in the interior of the input shaft 3 in a coaxial manner. An upper end portion of the torsion bar 4 is linked to an upper end portion of the input shaft 3 via a pin 10. A lower end portion of the torsion bar 4 projects from a lower end opening portion of the input shaft 3, and is linked to the output shaft 5 via a serration 11. The torsion bar 4 transmits the steering torque input into the input shaft 3 via the steering wheel to the output shaft 5, and is torsionally deformed about a rotation axis O in accordance with the steering torque.

The electric power steering apparatus 1 also includes the non-contact torque sensor 100 for detecting the steering torque acting on the torsion bar 4 that links the input shaft 3 to the output shaft 5.

The torque sensor 100 includes a magnetism generating portion 20 that is fixed to the input shaft 3 so as to rotate together with the input shaft 3, a rotating magnetic circuit portion 30 that is fixed to the output shaft 5 so as to rotate together with the output shaft 5, a fixed magnetic circuit portion 40 that is fixed to the upper housing 7, and a detection unit 50 for detecting a magnetic flux density that is guided from the magnetism generating portion 20 to the fixed magnetic circuit portion 40 through the rotating magnetic circuit portion 30 in accordance with the torsional deformation of the torsion bar 4. The torque sensor 100 detects the steering torque acting on the torsion bar 4 on the basis of an output value from the detection unit 50.

Instead of the above-mentioned configuration, the magnetism generating portion 20 may be fixed to the output shaft 5 so as to rotate together with the output shaft 5, and the rotating magnetic circuit portion 30 may be fixed to the input shaft 3 so as to rotate together with the input shaft 3.

Figure 2:
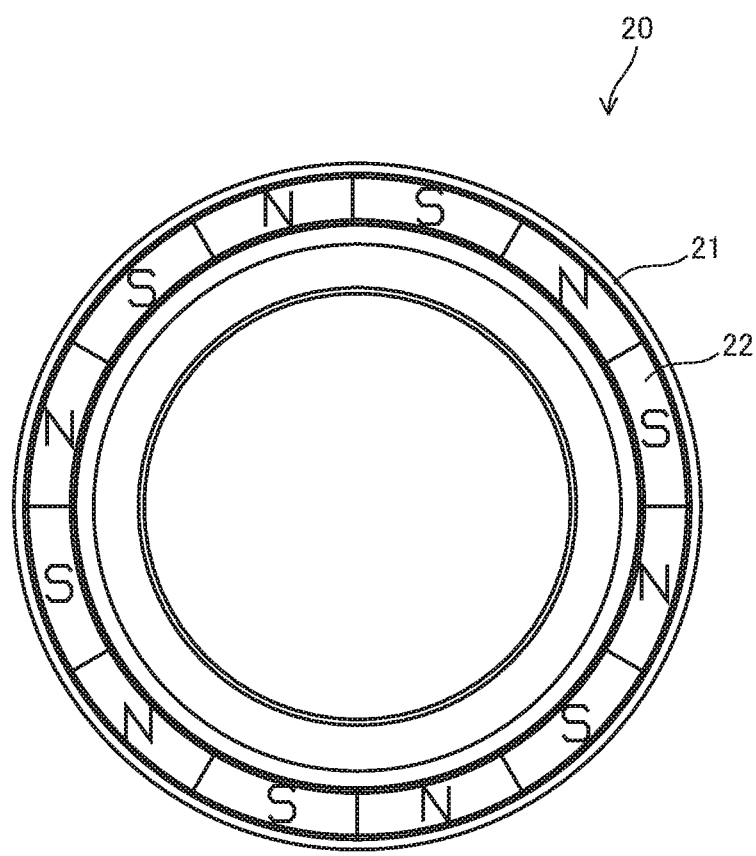
FIG. 2 is a bottom view of a magnetism generating portion.
Figure 3:
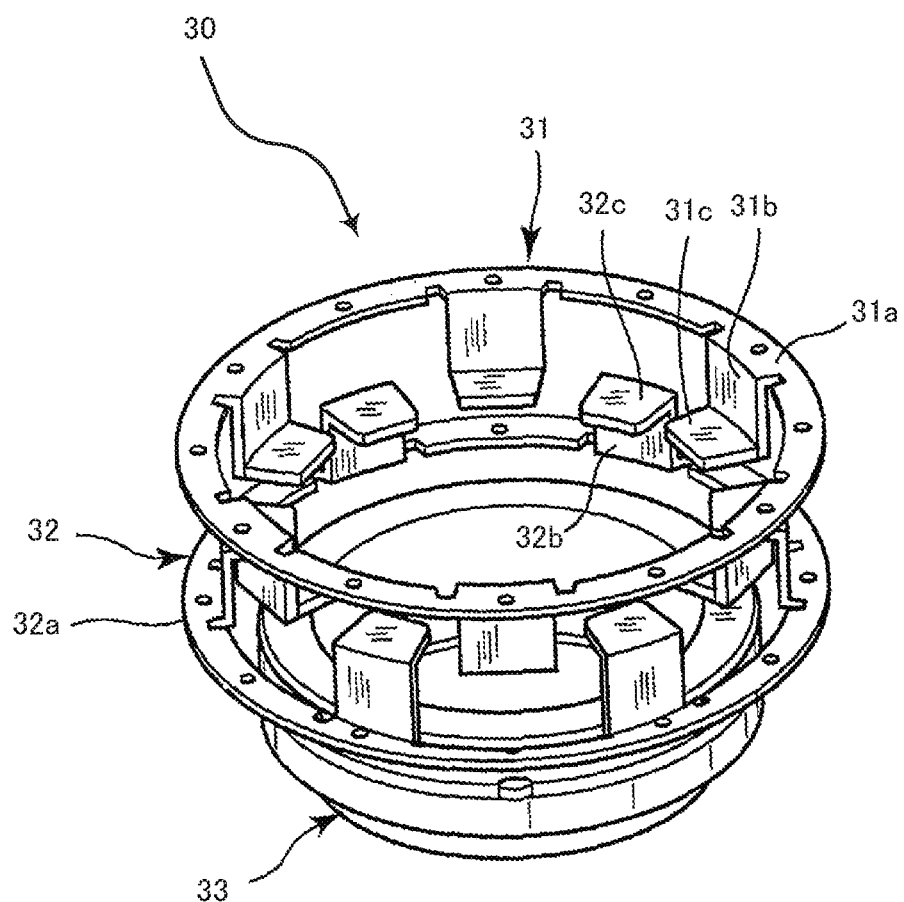
FIG. 3 is a perspective view of a rotating magnetic circuit portion.

FIG. 2 is a bottom view of the magnetism generating portion 20, and FIG. 3 is a perspective view of the rotating magnetic circuit portion 30.

As shown in FIGS. 1 and 2, the magnetism generating portion 20 includes an annular back yoke 21 that is press-fitted to the input shaft 3 and an annular ring magnet 22 that is jointed to a lower end surface of the back yoke 21.

The ring magnet 22 is an annular permanent magnet that generates magnetism in the rotation axis O direction of the input shaft 3. The ring magnet 22 is a multi-pole magnet that is formed by magnetizing a hard magnetic material to the rotation axis O direction and has twelve magnetic poles formed with equal width in the circumferential direction. That is, six N-poles and six S-poles are respectively disposed on upper and lower end surfaces of the ring magnet 22 in an alternate manner along the circumferential direction. A number of magnetic poles formed on the end surface of the ring magnet 22 may be set to any number more than two.

An upper magnetic pole surface that is the upper end surface of the ring magnet 22 is fixed to the bottom surface of the back yoke 21 through an adhesive. The back yoke 21 is made of a soft magnetic material and is attracted to the ring magnet 22 by being magnetized by a magnetic field produced by the ring magnet 22. In this way, the ring magnet 22 and the back yoke 21 are joined by an adhesive force of the adhesive and a magnetic force. The back yoke 21 functions both as a connecting member that connects the ring magnet 22 to the input shaft 3 and as a yoke that connects adjacent magnetic poles of the ring magnet 22 so as to guide the magnetic flux, and thereby, a magnetic force is concentrated on a lower magnetic pole surface that is the lower end surface of the ring magnet 22.

As shown in FIGS. 1 and 3, the rotating magnetic circuit portion 30 includes a first soft magnetic ring 31 and a second soft magnetic ring 32 to which the magnetic flux generated by the ring magnet 22 of the magnetism generating portion 20 is guided, an attachment member 33 that is attached to the output shaft 5, and molding resin 34 for fixing the first soft magnetic ring 31 and the second soft magnetic ring 32 to the attachment member 33.

The first soft magnetic ring 31 includes an annular first magnetic path ring portion 31a, first magnetic path column portions 31b that project downward from the first magnetic path ring portion 31a, and first magnetic path tip portions 31c that are bent inward from lower ends of the respective first magnetic path column portions 31b so as to face against the lower end surface of the ring magnet 22. The second soft magnetic ring 32 includes an annular second magnetic path ring portion 32a, second magnetic path column portions 32b that project upward from the second magnetic path ring portion 32a, and second magnetic path tip portions 32c that are bent inward from upper ends of the respective second magnetic path column portions 32b so as to face against the lower end surface of the ring magnet 22.

The first soft magnetic ring 31 and the second soft magnetic ring 32 are respectively formed by press working. The first soft magnetic ring 31 and the second soft magnetic ring 32 may be formed by casting, sintering, and the like instead of press working.

The first magnetic path tip portions 31c and the second magnetic path tip portions 32c are formed in a flat plate shape. The first magnetic path tip portions 31c and the second magnetic path tip portions 32c are alternately disposed at equal intervals along the circumferential direction about the rotation axis O on the same plane that is orthogonal to the rotation axis O of the torsion bar 4.

The first magnetic path tip portions 31c and the second magnetic path tip portions 32c are disposed such that the center lines thereof extending in a radial direction of the torsion bar 4 match with boundaries between the N-poles and the S-poles of the ring magnet 22 in a neutral condition where no torque acts on the torsion bar 4.

The first magnetic path column portions 31b and the second magnetic path column portions 32b are respectively formed in a flat plate shape and provided to extend in the rotation axis O direction. The first magnetic path column portions 31b are disposed at predetermined intervals so as to surround an outer peripheral surface of the ring magnet 22. The first magnetic path column portions 31b are disposed not to short-circuit the magnetic flux of the ring magnet 22. The second magnetic path column portions 32b are provided to extend along the rotation axis O in the opposite direction from the first magnetic path column portions 31b.

The first magnetic path ring portion 31a and the second magnetic path ring portion 32a are disposed on a plane orthogonal to the rotation axis O and formed in a ring shape so as to have a continuous circumference. The first magnetic path ring portion 31a and the second magnetic path ring portion 32a are not limited to the above configuration and may be formed in a C-shape having a partially formed slit.

The first magnetic path ring portion 31a is disposed above the lower end portion of the ring magnet 22 and the second magnetic path ring portion 32a is disposed below the ring magnet 22. That is, the ring magnet 22 is disposed between the first magnetic path ring portion 31a and the second magnetic path ring portion 32a with respect to the rotation axis O direction.

As shown in FIG. 1, the fixed magnetic circuit portion 40 includes a first magnetic collecting ring 41 that is provided along an outer periphery of the first magnetic path ring portion 31a of the first soft magnetic ring 31, and a second magnetic collecting ring 42 that is provided along an outer periphery of the second magnetic path ring portion 32a of the second soft magnetic ring 32.

The first magnetic collecting ring 41 and the second magnetic collecting ring 42 have a C-shape having a partially formed slit and are fixed to an inner circumferential surface of the upper housing 7 by caulking. An inner circumferential surface of the first magnetic collecting ring 41 faces against the first magnetic path ring portion 31a of the first soft magnetic ring 31, and an inner circumferential surface of the second magnetic collecting ring 42 faces against the second magnetic path ring portion 32a of the second soft magnetic ring 32.

In this way, the first magnetic collecting ring 41 and the second magnetic collecting ring 42 are disposed on an outer circumference of the rotating magnetic circuit portion 30, and have a function of reducing influence of rotational vibration or eccentricity of the rotating magnetic circuit portion 30 and guiding the magnetic flux to a detection unit 50 side.

The detection unit 50 is disposed on a radial-side surface of the upper housing 7. The detection unit 50 includes a first magnetism collecting yoke 51 that abuts against the first magnetic collecting ring 41, a second magnetism collecting yoke 52 that abuts against the second magnetic collecting ring 42, a magnetic sensor 53 that is provided in a gap between the first magnetism collecting yoke 51 and the second magnetism collecting yoke 52, a circuit board 54 that is electrically connected to the magnetic sensor 53, and mold resin 55 that integrally supports the first magnetism collecting yoke 51, the second magnetism collecting yoke 52, the magnetic sensor 53, and the circuit board 54.

The first magnetism collecting yoke 51 is formed in a block shape so as to have an arc-shaped inner circumferential surface abutting against an outer circumferential surface of the first magnetic collecting ring 41. The second magnetism collecting yoke 52 is formed in a block shape so as to have an arc-shaped inner circumferential surface abutting against an outer circumferential surface of the second magnetic collecting ring 42.

The first magnetism collecting yoke 51 and the second magnetism collecting yoke 52 faces each other with a magnetic gap therebetween as a predetermined gap, and the magnetic sensor 53 is disposed in this magnetic gap. The first magnetism collecting yoke 51 and the second magnetism collecting yoke 52 have a function of collecting the magnetic flux transmitted from the rotating magnetic circuit portion 30 into the magnetic sensor 53 through the first magnetic collecting ring 41 and the second magnetic collecting ring 42, respectively.

The magnetic sensor 53 is connected to the circuit board 54 and detects the magnetic flux density guided to the fixed magnetic circuit portion 40. The magnetic sensor 53 is a hall element and outputs a voltage corresponding to the magnetic flux density passed therethrough as a signal.

The circuit board 54 includes one or more electronic components (not shown) that constitutes a circuit for amplifying a signal of the hall element, a circuit for performing temperature compensation, a noise filter circuit, and the like. The circuit board 54 processes a voltage output from the magnetic sensor 53 corresponding to magnitude and a direction of a magnetic field of the magnetic gap. A processed signal is output outside through an output terminal 81 (see FIG. 8) that is connected to through holes 54a (see FIG. 5) formed on the circuit board 54.

Figure 4:
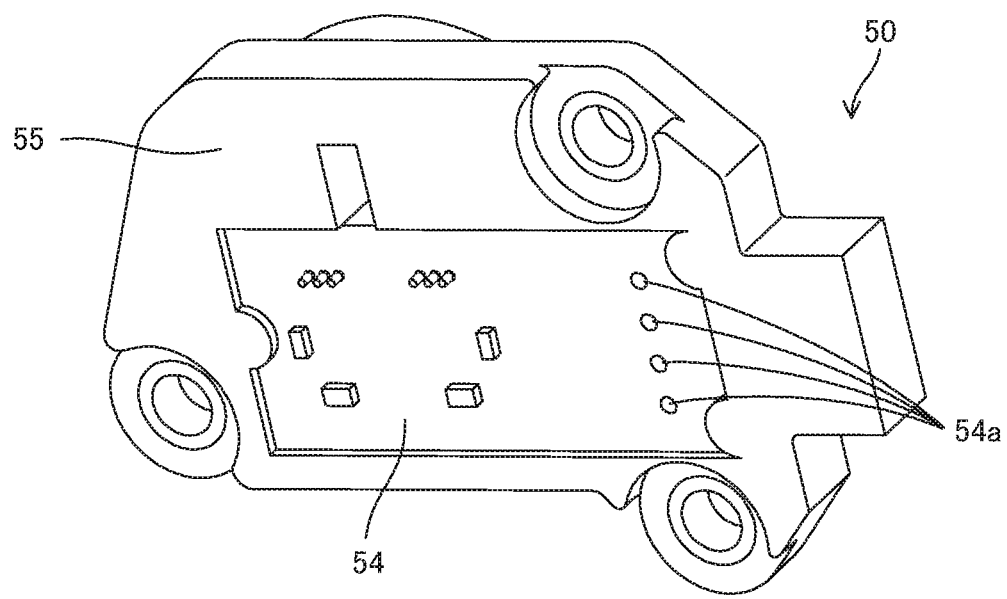
FIG. 4 is a perspective view of a detection unit viewed from outside of an upper housing.
Figure 5:
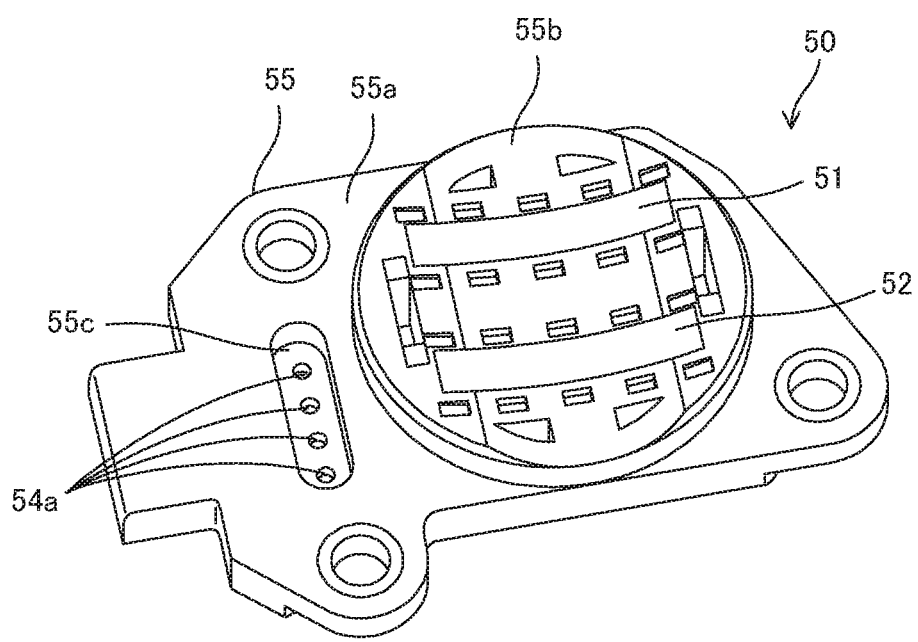
FIG. 5 is a perspective view of the detection unit viewed from inside of the upper housing.

FIG. 4 is a perspective view of a detection unit 50 viewed from outside of an upper housing 7. FIG. 5 is a perspective view of the detection unit 50 viewed from inside of the upper housing 7.

As shown in FIG. 4, an outer-side surface of the detection unit 50 is formed in a planar shape by mold resin 55. The circuit board 54 is disposed at an inner-side position from an outer-side surface of the detection unit 50 at a predetermined depth. The predetermined depth is set to be deeper than a mounting height of the electronic components provided on the circuit board 54.

As shown in FIG. 5, an inner-side surface of the detection unit 50 includes a flat portion 55a that is formed in a planer shape by the mold resin 55 and a circular projecting portion 55b that is projected from the flat portion 55a. The projecting portion 55b is disposed with the first magnetism collecting yoke 51 and the second magnetism collecting yoke 52. The flat portion 55a is formed with a recessed portion 55c so that the through holes 54a of the circuit board 54 are exposed to the surface.

Hereinafter, the following describes a structure of the upper housing 7 that is attached with the detection unit 50.

Figure 6:
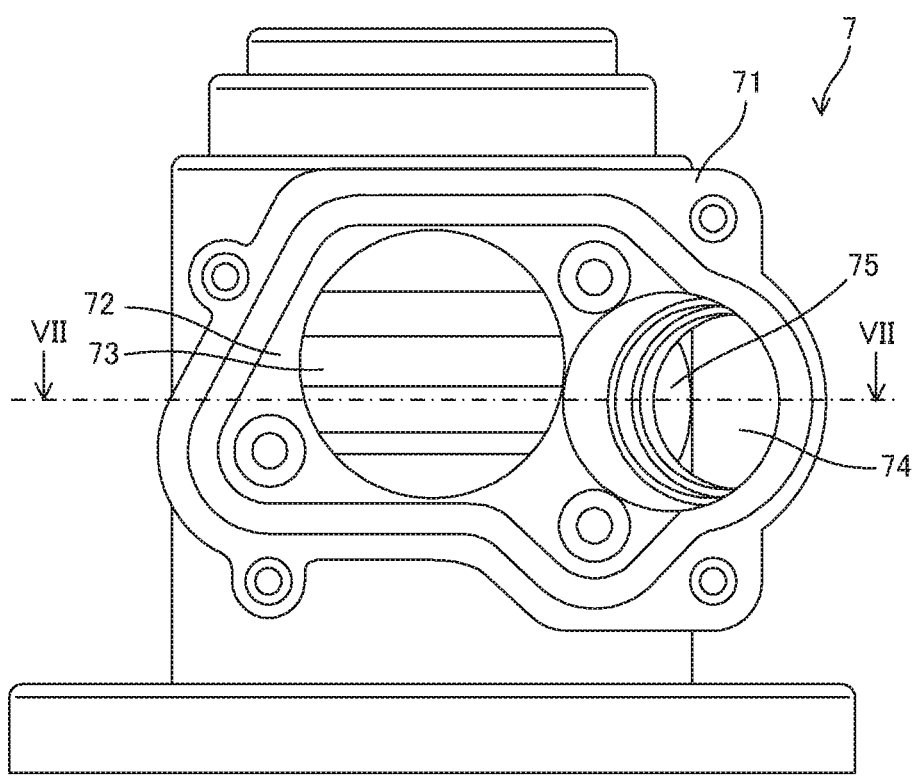
FIG. 6 is a plan view illustrating a side surface of the upper housing.
Figure 7:
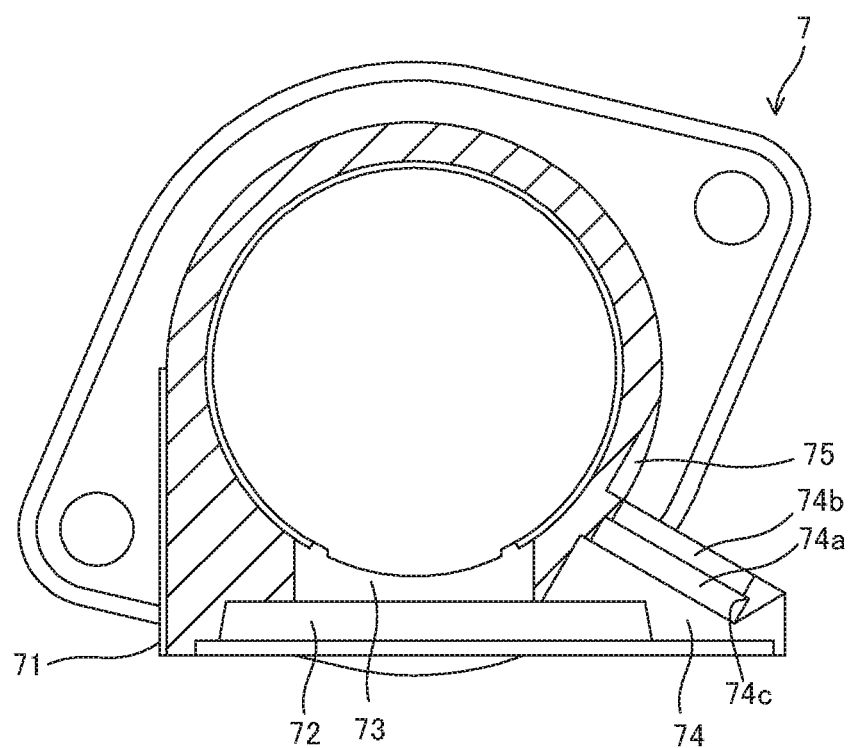
FIG. 7 is a cross-sectional view taken along the line VII-VII of FIG. 6.

FIG. 6 is a side view of the upper housing 7 viewed from the side thereof. FIG. 7 is a cross-sectional view taken along the line VII-VII of FIG. 6.

As shown in FIG. 1, the upper housing 7 is formed in a cylindrical shape as a whole that has the axial center parallel to the steering shaft 2.

As shown in FIGS. 6 and 7, an annular raised portion 71 is formed on the radial-side surface of the upper housing 7 so as to be raised outward in the radial direction from an outer circumferential surface thereof. The raised portion 71 is integrally formed with the upper housing 7, and has a housing chamber 72 that is defined so as to accommodate the detection unit 50 therein.

On a bottom portion of the housing chamber 72, a through hole 73 and a communication hole 74 are formed. The through hole 73 is formed so as to penetrate through the upper housing 7 from the housing chamber 72 toward the inside of the upper housing 7. The communication hole 74 is disposed adjacent to the through hole 73 and formed so as to penetrate through the raised portion 71 from the housing chamber 72 towards the outer circumference of the upper housing 7 (that is, towards the outside of the housing chamber 72). The through hole 73 and the communication hole 74 are inclined relative to one another, and openings thereof are arranged adjacent to each other on the bottom portion of the housing chamber 72.

The through hole 73 is formed to have the same inner diameter from the bottom portion of the housing chamber 72 to the inside of the upper housing 7. The through hole 73 is fitted with the projecting portion 55b of the detection unit 50 accommodated in the housing chamber 72.

The communication hole 74 is provided so as to extend in the tangential direction with respect to the outer circumference of the upper housing 7, thereby making the inside and the outside of the housing chamber 72 communicate with each other. The communication hole 74 is constituted by a large diameter portion 74a disposed on the inner side of the housing chamber 72 and a small diameter portion disposed on the outer side of the housing chamber 72, and a stepped portion 74c is formed between the large diameter portion 74a and the small diameter portion 74b.

At a position near the outer side of the communication hole 74 on the outer circumferential surface of the upper housing 7, a recess 75 that is curved inwardly along the extending direction of the communication hole 74 is formed. The recess 75 prevents interference of the output terminal 81 (see FIG. 8) with the outer circumferential surface of the upper housing 7.

Figure 8:
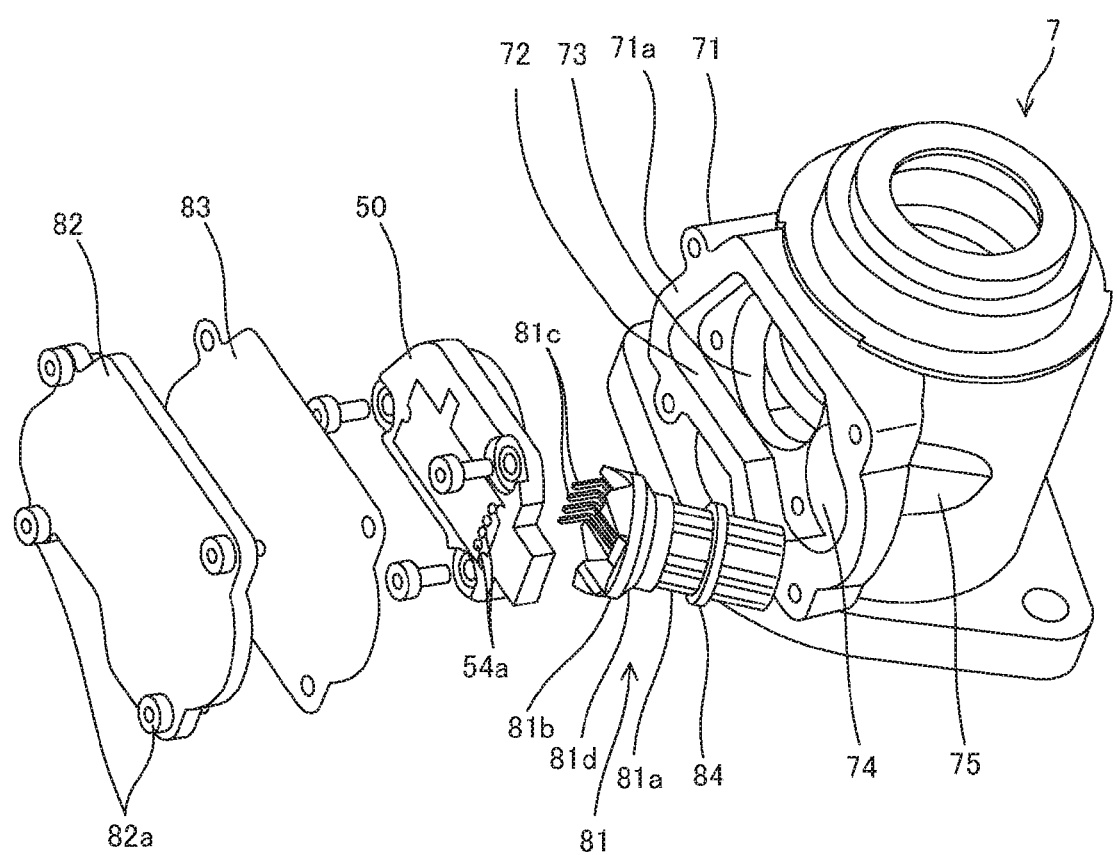
FIG. 8 is an exploded perspective view of a torque sensor incorporated into the upper housing.

FIG. 8 is an exploded perspective view of the torque sensor 100 incorporated into the upper housing 7.

The torque sensor 100 includes the output terminal 81 that is connected to the detection unit 50 accommodated in the housing chamber 72 of the upper housing 7, a cover 82 that closes the opening portion 71a of the housing chamber 72, and a seal plate 83, serving as a first seal member, that is interposed between the opening portion 71a of the housing chamber 72 and the cover 82.

The output terminal 81 is fitted into the communication hole 74 of the upper housing 7 from the housing chamber 72 side and connected to the detection unit 50 in a tilting state, so as to output a signal processed by the circuit board 54 to the outside. The output terminal 81 includes a columnar fitting portion 81a that is fitted into the communication hole 74 and a terminal portion 81b that has an outer diameter larger than an inner diameter of the communication hole 74.

Four terminals 81c that are respectively inserted into the through holes 54a of the circuit board 54 are formed on the terminal portion 81b in a projected manner. A stepped portion 81d is formed at a boundary between the fitting portion 81a and the terminal portion 81b, and the stepped portion 81d is disposed with a seal ring 84, serving as a second seal member, that has an inner diameter substantially equal to an outer diameter of the fitting portion 81a. The seal ring 84 is held between the stepped portion 81d of the output terminal 81 and a stepped portion 74c of the communication hole 74 by inserting the output terminal 81 from the housing chamber 72 side, and thereby, the communication hole 74 is sealed.

The cover 82 is made of metal and is formed in a plate shape. The cover 82 is formed to have substantially the same shape as that of the opening portion 71a of the housing chamber 72 of the upper housing 7, and a plurality of bolt holes 82a are formed on an outer circumference of the cover 82. The cover 82 is fastened with bolts on the opening portion 71a of the housing chamber 72 in a state in which the cover 82 is provided so as to cover the raised portion 71.

The seal plate 83 is formed to have substantially the same shape as that of the cover 82 and is fastened with bolts on the opening portion 71a of the housing chamber 72 together with the cover 82. The seal plate 83 is held between the cover 82 and the opening portion 71a so as to seal the opening portion 71a over the entire circumference thereof.

As shown in FIG. 8, the output terminal 81 is first fitted into the communication hole 74 in the housing chamber 72. In this way, the communication hole 74 is sealed by the seal ring 84.

Next, the detection unit 50 is accommodated in the housing chamber 72 so that the terminals 81c of the output terminal 81 are inserted into the through holes 54a of the circuit board 54. The terminals 81c of the output terminal 81 and the circuit board 54 are fixed by soldering in this state.

Subsequently, the seal plate 83 and the cover 82 are covered on the opening portion 71a of the housing chamber 72 in this order, and the cover 82 is fastened with bolts on the opening portion 71a so that the opening portion 71a is sealed by the seal plate 83. The housing chamber 72 is fully sealed from the outside by the seal ring 84 and the seal plate 83.

According to the above embodiment, the following effects are exerted.

The communication hole 74 into which the output terminal 81 is fitted is provided so as to extend in the tangential direction with respect to the outer circumference of the upper housing 7, and the output terminal 81 is connected to the detection unit 50 in a tilting state. This makes it possible to improve mountability of the torque sensor 100 to a vehicle by reducing the projection amount in the radial direction of the output terminal 81 in the torque sensor 100.

Further, there is provided the housing chamber 72 that is formed so as to be raised outward in the radial direction from the outer circumferential surface of the upper housing 7, so that the through hole 73 opens into the interior of the housing chamber 72 and the detection unit 50 is accommodated therein. Thus, solidity of the detection unit 50 can be improved because the periphery of the detection unit 50 is surrounded with the raised portion 71.

Further, the output terminal 81 is fitted into the communication hole 74 from the inner side of the housing chamber 72, and the detection unit 50 is accommodated in the housing chamber 72, and thereby, the detection unit 50 and the terminal portion 81b are connected. Thereby, as compared with the case in which the detection unit 50 and the terminal portion 81b are separately attached to the side surface of the upper housing 7, since the number of parts and the assembly processes can be reduced, it is possible to reduce the manufacturing cost.

Further, the terminals 81c and the circuit board 54 are fixed by soldering after the output terminal 81 is fitted into the communication hole 74 and the detection unit 50 is accommodated in the housing chamber 72. Thus, any stress can be prevented from remaining in soldering parts regardless of variations in assembly accuracy of the detection unit 50 and the output terminal 81. In addition, a connection state of the terminals 81c and the circuit board 54 can be more securely held.

Further, the seal plate 83 is interposed between the opening portion 71a and the cover 82 closing the opening portion 71a of the housing chamber 72, and the seal ring 84 is interposed on the stepped portion 81d at a boundary between the fitting portion 81a of the output terminal 81 and the terminal portion 81b. Thus, waterproofness of the housing chamber 72 can be maintained.

Further, since waterproofness of the detection unit 50 is maintained by maintaining the waterproofness of the housing chamber 72, the detection unit 50 itself need not have the waterproofness. Thereby, simplification and miniaturization of the structure of the detection unit 50 is achieved, and this makes it possible to improve mountability to a vehicle by reducing the projection amount in the radial direction in the torque sensor 100.

It is also not necessary for the maintaining waterproofness of the detection unit 50 to apply a special waterproof structure. Thus, simplification and miniaturization of the structure of the detection unit 50 is achieved, and it is possible to reduce the manufacturing cost.

Since the cover 82 closing the opening portion 71a of the housing chamber 72 is made of metal, the detection unit 50 accommodated in the housing chamber 72 can be more firmly protected. The cover 82 also has antimagnetic performance because it is made of metal. Thereby, the detection unit 50 can be prevented from being affected by magnetism from parts installed around the upper housing 7 to prevent decrease in detection accuracy of the torque sensor 100.

The embodiments of the present invention described above are merely illustration of some application examples of the present invention and not of the nature to limit the technical scope of the present invention to the specific constructions of the above embodiments.

For example, the foregoing embodiment has described an example case in which the torque sensor 100 is applied to the electric power steering apparatus 1. However, the torque sensor 100 may be applied to other apparatuses.

The foregoing embodiment has also described an example case in which the output terminal 81 is fitted into the communication hole 74 from the inner side of the housing chamber 72. However, the output terminal 81 may be fitted into the communication hole 74 from the outer side of the housing chamber 72.

In the foregoing embodiment, the detection unit 50 and the output terminal 81 are formed as separate members, and the detection unit 50 is accommodated in the housing chamber 72 after the output terminal 81 is fitted into the communication hole 74. However, the detection unit 50 and the output terminal 81 may be formed integrally.

In the foregoing embodiment, the seal plate 83 is interposed between the opening portion 71a of the housing chamber 72 and the cover 82. However, instead of the seal plate 83, a seal ring that is formed in a ring shape along the outer circumference of the cover 82 may be used.

In the foregoing embodiment, the seal ring 84 is provided on the stepped portion 81d at a boundary between the fitting portion 81a of the output terminal 81 and the terminal portion 81b. However, as long as the sealing of the communication hole 74 is ensured, a seal structure other than the seal ring 84 may be applied.

In the foregoing embodiment, although the cover 82 is made of metal, it may be made of other materials.

The present application claims a priority based on Japanese Patent Application No. 2014-146731 filed with the Japan Patent Office on Jul. 17, 2014, all the contents of which are hereby incorporated by reference.

The invention claimed is:

1. A torque sensor for detecting a torque acting to a input shaft on the basis of magnetic transition caused by relative angular displacement between the input shaft and an output shaft rotatably supported in a housing, comprising:
   a detection unit configured to detect the magnetic transition through a through hole formed so as to penetrate a radial-side surface of the housing;
   a housing chamber formed to be raised outward in a radial direction from an outer circumferential surface of the housing, the through hole opening into the housing chamber accommodating the detection unit;
   a communication hole provided so as to extend in a tangential direction with respect to an outer circumference of the housing, the communication hole making an outside of the housing and an inside of the housing chamber communicate with each other; and
   an output terminal fitted into the communication hole and connected to the detection unit in a tilting state, the output terminal being configured to output a signal to outside on the basis of a detected signal.

2. The torque sensor according to claim 1, wherein the detection unit and the output terminal are connected where the output terminal is fitted into the communication hole from an inner side of the housing chamber and the detection unit is accommodated in the housing chamber.

3. The torque sensor according to claim 1, wherein the output terminal further includes a fitting portion fitted into the communication hole and a terminal portion having an outer diameter larger than an inner diameter of the communication hole, and
the torque sensor further comprising:
   a cover configured to close an opening portion of the housing chamber;
   a first seal member interposed between the opening portion of the housing chamber and the cover so as to seal the opening portion over an entire circumference; and
   an annular second seal member arranged on a stepped portion at a boundary between the fitting portion of the output terminal and the terminal portion so as to seal the communication hole.

4. The torque sensor according to claim 3, wherein the cover is made of metal.

5. An electric power steering apparatus comprising the torque sensor according to claim 1.

* * * * *